Dec. 18, 1928.  
D. W. SMITH  
ADJUSTING MECHANISM FOR HARVESTER REELS  
Filed May 3, 1926
1,695,510
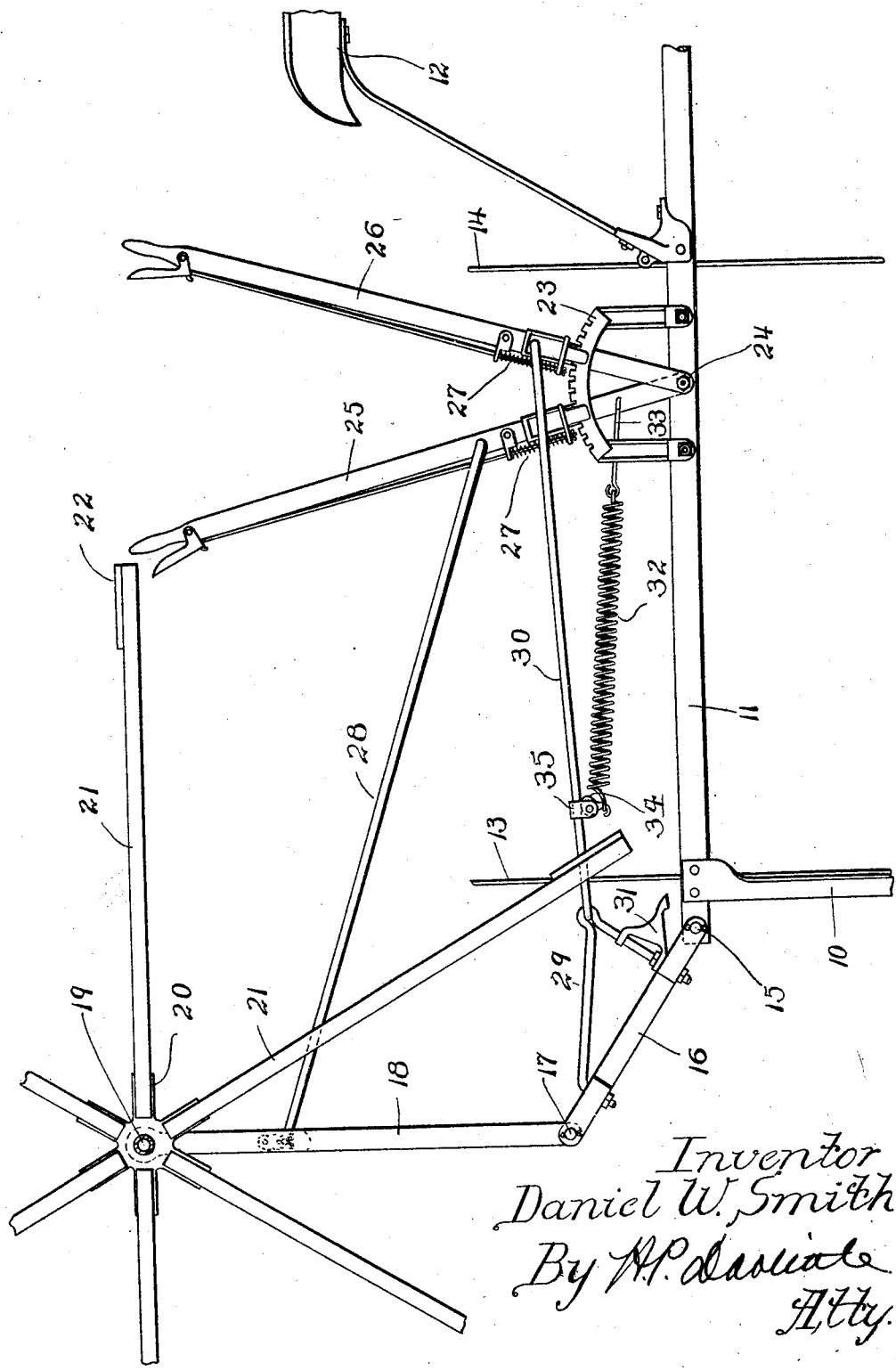

Patented Dec. 18, 1928.

1,695,510

UNITED STATES PATENT OFFICE.

DANIEL W. SMITH, OF OAK PARK, ILLINOIS, ASSIGNOR TO INTERNATIONAL HARVESTER COMPANY, A CORPORATION OF NEW JERSEY.

ADJUSTING MECHANISM FOR HARVESTER REELS.

Application filed May 3, 1926. Serial No. 106,191.

This invention relates to an improved adjusting mechanism for grain harvesters. Specifically, it relates to means for assisting the mechanism which effects fore and aft, as well as up and down, movement or adjustment of the reel; the same means functioning to counterbalance the weight of the reel in its movements.

In the standard grain harvester, as it is now known, the reel is mounted for adjustment in an up and down direction as well as for adjustment in a fore and aft direction. Such movements of the reel are effected by a lever mechanism controlled by the operator, such mechanism comprising two levers, one of which controls the up and down adjustment of the reel, while the other is effective to control the other, or fore and aft movement of the reel. In the past, each of these levers was provided with a spring connection, each spring functioning to aid its particular lever in moving the reel. While such two-spring constructions performed satisfactorily, they were nevertheless too complex in structure for the work they had to accomplish and thus an improvement simplifying the mechanism is very desirable.

Accordingly, it is the main purpose of this invention to simplify harvester reel adjusting mechanisms, thereby making the same less expensive and less likely to get out of order.

Other objects should be apparent as the description of this invention progresses.

The object sought is accomplished in the provision of a single resilient member or spring which is connected in such a manner with the levers and reel as to serve the dual function of aiding adjustment of the reel up or down, and counterbalancing its weight when the same is moved fore and aft.

Reference should now be made to the accompanying sheet of drawing showing an illustrative embodiment of the invention, wherein the single figure is an elevational view of so much of the conventional harvester structure as is necessary to this disclosure and an understanding of this invention, the improved reel controlling mechanism being shown in position on the harvester frame.

Viewing this single figure of drawing, there is shown part of a harvester frame, indicated at 10, which carries a longitudinally disposed frame member in the form of a pipe 11, the rear end supporting the usual seat 12 for the operator of the harvester. At 13 and 14, respectively, are indicated the front and rear elevator boards for a conveyor, not shown.

The forward end of the pipe 11 has journaled therein a shaft 15 for pivotally mounting a reel arm 16, the arm carrying in its free upper end a shaft or pin 17 for pivotally connecting thereto an upright reel support 18, which in turn rotatably carries in its upper free end a reel shaft 19. This conventionally carries the spider 20 in which are fitted the arms 21, which carry at their extremities the reel bats 22. The far end of the reel shaft, of course, is similarly constructed and supported, and, as this is standard structure and unnecesary to this disclosure, the same has not been illustrated.

Adjacent the operator's seat, the pipe 11 is provided with the usual arcuate toothed rack 23 and a pin 24 serving as the fulcrum for a lever 25 and a similar lever 26, each lever being provided with the customary detents 27 for engagement with the toothed rack, as will be understood.

The first mentioned lever 25 has a link connection 28 to the reel upright or support 18. The arm 16 is provided with a bracket 29 which has a link connection 30 with the lever 26. The bracket 29, it will be noted, carries a stop member 31.

Heretofore, each of the levers shown was provided with a resilient or spring connection to the reel for assisting the respective levers. By this invention, as stated in the objects already recited, only one spring is provided, which is so connected that it will serve both levers. This single spring is indicated at 32, and it will be seen that at one end it is connected by a hook and eye link 33 to the lower end of the lever 25 and at its other end, is connected to the hooked end of a cam lever 34 pivoted in a sleeve 35 carried on the link 30. It will be seen that the pull of spring 32 will cause the cam 34 to grip the link to securely hold one end of the spring fast. The sleeve 34 can also be adjusted along the link 30, as will be understood.

In operation, if it is desired to raise or lower the reel, the lever 26 is actuated upon release of its detent and the reel arm 16 swings on the pin 15 as a fulcrum, the spring 32 aiding the lever because of its connection with the link 30 connecting the lever 26 and the arm 16, by means of the bracket 29. The other end of the spring is fixed to the lever 25, which at this time is stationary, thus permitting elongation or compression of the spring. The stop 31 limits rearward movement of the arm 16 by contacting the pipe 11. If it is desired to adjust the reel fore and aft, this is done by actuating the lever 25 and through the link 28 move the support 18 on the pivot pin 17. The spring 32 counterbalances the weight of the reel because of its connection to the lever 25 and the member 34 which serves as a fixed point for stretching or compressing the said spring.

Thus, it will be seen that the mechanism disclosed accomplishes the very desirable objects sought. It is to be understood that the invention is susceptible of modification and change, and it is the intention to cover all such changes which fall within the spirit of this invention as indicated in the following claims.

What is claimed is:

1. In a harvester, the combination of a reel carried thereby for up and down and fore and aft movement, a lever, a connection from the lever to the reel for moving the reel fore and aft, a second lever, a connection therefrom to the reel for moving it up and down, and a resilient connection between the first lever and the connection between the second lever and reel.

2. In a harvester having a frame, the combination of a reel carried by a support pivoted on the frame for up and down and fore and aft movement, a lever, a connection from the lever to the reel support for moving the reel fore and aft, a second lever, a connection therefrom to the reel support for moving the reel up and down, and a spring fixedly connected to the first lever and adjustably anchored to the connection between the second lever and reel support at a predetermined point thereon.

3. In a harvester having a frame, the combination of a reel carried by a support pivoted on the frame for up and down and fore and aft movement, a lever, a connection from the lever to the reel support for moving the reel fore and aft, a second lever, a connection therefrom to the reel support for moving the reel up and down, an anchor member slidably carried on the second connection including a lock means, and a spring connected to the first lever and to said lock means, whereby the pull of the spring actuates said lock means to secure the anchor member on said second connection.

In testimony whereof I affix my signature.

DANIEL W. SMITH.